United States Patent [19]

McClish

[11] Patent Number: 4,884,486
[45] Date of Patent: Dec. 5, 1989

[54] ELECTRONIC SCRATCH FILTER FOR BOWED INSTRUMENTS

[76] Inventor: Richard E. D. McClish, 1739 Addison suite 15, Berkeley, Calif. 94703

[21] Appl. No.: 344,488

[22] Filed: Apr. 27, 1989

Related U.S. Application Data

[63] Continuation of Ser. No. 198,780, May 25, 1988, abandoned.

[51] Int. Cl.$^4$ .......................... G01H 1/12; G01H 3/18
[52] U.S. Cl. .......................................... 84/736; 84/741; 84/DIG. 9
[58] Field of Search ........................ 84/1.01, 1.04–1.16, 84/DIG. 9; 381/46, 47, 49, 94, 118

[56] References Cited

U.S. PATENT DOCUMENTS

| | | | |
|---|---|---|---|
| 3,911,776 | 10/1975 | Beigel | 84/1.11 |
| 3,960,043 | 6/1976 | Brand | 84/1.11 X |
| 4,151,775 | 5/1979 | Merriman | 84/1.16 X |
| 4,300,431 | 11/1981 | DeRocco | 84/1.11 X |
| 4,627,323 | 12/1986 | Gold | 84/1.16 X |

*Primary Examiner*—Stanley J. Witkowski

[57] ABSTRACT

The tone signal from a transducer monitoring the music vibrations of a bowed musical instrument contains an objectionable friction noise component which is removed by passing the tone signal through a high-pass filter having a variable cutoff frequency which is controlled by a pitch detector monitoring the fundamental frequency of a played note in the tone signal. The cutoff frequency of the filter is kept slightly below the fundamental frequency of the played note to avoid altering the tone color of the tone signal. When no fundamental frequency is detected by the pitch detector, the cutoff frequency of the filter remains at a pre-determined minimum which may be adjustable by the musician for best effect when strings are both bowed and plucked. The filtered tone signal may be applied to the pitch detector in order to increase the accuracy of the pitch detection process and thus increase the accuracy of the noise reducing characteristics of the system.

12 Claims, 3 Drawing Sheets

4,884,486

ELECTRONIC SCRATCH FILTER FOR BOWED INSTRUMENTS

This application is a continuation of application serial No. 198,780 filed May 25, 1988 and now abandoned.

TECHNICAL FIELD

The present invention relates to bowed musical instruments and more specifically to the electronic reduction of friction noise in the signal from transducers used in connection therewith.

BACKGROUND ART

Transducers are commonly used in connection with bowed musical instruments in order to allow these instruments to be amplified, recorded or to allow them to control other instruments such as music synthesizers. When a bowed instrument is played by drawing the bow across a string, a friction noise is generated in the string at the point of contact between the string and the bow. This friction noise is transmitted through the string into the bridge of the instrument. In conventional acoustic instruments, this bow noise does not have much projection power and becomes less objectionable as the distance between the instrument and the listener is increased. The musician playing the conventional acoustic instrument may ignore this bow noise in the confidence that the listener does not perceive it to an objectionable degree.

A first problem exists when an electric instrument is being played and reproduced by an amplifier, that the player and the listener hear approximately the same sound. The listener is then subjected to a significantly greater amount of bow noise than he is normally subjected to when listening to an acoustic instrument. The disproportion in the bow noise level gives the sound of the instrument a "scratchy" character which is objectionable. This condition is worsened when the instrument has a bridge pickup. Since the bow noise enters the instrument through the bridge, there will consequently be a higher degree of bow noise with this type of pickup which otherwise transduces the desirable music vibrations in a very satisfactory manner.

A second problem exists when the pickup signal of an electric bowed instrument is analyzed to produce a fundamental frequency related signal, that the bow noise present in the pickup signal may interfere with the analysis and result in erroneous signals and correspondingly erroneous control commands. This is particularly objectionable when controlling a second instrument such as a music synthesizer.

A third problem exists when the direction of bowing is changed while playing an electric bowed instrument, that a thumping sound is generated as a result of the bow noise suddenly stopping and then starting again.

A fourth problem exists, when using frequency shifting devices such as transposers or frequency dividers of the gated-signal type for producing sub-octave tone signals, that the bow noise gets correspondingly lowered in frequency in each corresponding sub-octave voice thus generated, making the resulting complex tones sound rather artificial.

It is accordingly a broad object of the present invention to provide a tone signal filter which selectively removes the undesirable portion of friction noise present in the signal from a transducer monitoring the desirable string vibrations of a bowed musical instrument.

It is a more specific object of the present invention to effect this selective noise reduction without significantly altering the tonal balance of the tone signal from the transducer.

It is another object of the present invention to selectively remove the noises in the transducer signal resulting from changes in the direction of bowing of the instrument.

It is a further object of the present invention to provide a filter which passes the signal transients resulting from plucking the strings, in an independent manner and possibly in an independently adjustable manner.

It is a still further object of the present invention to provide a bow noise filter which may be used in conjunction with frequency shifting devices to produce realistic sub-octave voices having the tonal characteristics of the bowed instruments producing the corresponding frequency range.

SUMMARY OF THE INVENTION

According to the invention, a transducer monitors the displacements of a bowed vibrating element such as a violin string under tension. Bow noise is present in the transducer signal when the bow is dragged across the vibrating element. When a note is bowed, the bow noise is mixed with the desirable music vibrations of the vibrating element. The portion of the bow noise which is not masked by the desirable music vibrations of the vibrating element tends to give the sound of the instrument a "scratchy" character and is preferably selectively reduced sufficiently for the masking effect to take place.

In order to selectively reduce and possibly remove the objectionable portion of the bow noise, the transducer signal is applied to a high-pass filter having a variable cutoff frequency which is controlled by a real-time fundamental frequency detector. The fundamental frequency detector produces a signal, the magnitude of which is a function of the fundamental frequency of the played note. The cutoff frequency of a filter usually means the $-3$ db point in the filter's frequency response. The signal attenuating characteristics of high-pass filter is well known in the prior art. The cutoff frequency of the filter is made to track the fundamental frequency of the played note. The cutoff frequency of the filter is preferably kept at or slightly below the fundamental frequency of the played note, to avoid attenuating the desirable music components of the transducer signal to a significant degree, which would alter the tonal balance of the filtered transducer signal.

When no note is being played, the cutoff frequency of the filter remains at a fixed point which is referred to herein as the "idle" frequency of the filter. This idle frequency may be adjustable by the musicican who can set the filter response to his or her taste. The idle frequency of the filter is preferably set at or above the lowest played note to be passed by the filter. The point at which the idle frequency of the filter is set has a unique effect on the filter's dynamic response. It is thus possible to adjust the response of the filter to the signal transients caused by the plucking of a string, independently of the filter's response to the bowed signal. This is possible because there is no fundamental frequency to be detected in the string vibrations when the plucking finger damps the vibrations in the string immediately before releasing it to start a plucked note. The adjustable idle frequency of the scratch filter enables the musician to set the frequency response for best effect during bowed passages while being capable of independently adjusting the intensity of the plucking attacks. This feature may also be used by the musician to achieve novel tonal effects.

The beginning of a bowed note is a much more gradual event than the attack of a plucked note. The filter has thus more time to reach a stable tracking state at the beginning of a bowed note. The filter preferably has a short settling time in order to track rapid intervals in a fairly accurate manner. The magnitude of the reaction time of the filter is determined by the ability of the ear to discern a change in the tonal balance of the tone signal. If the filter has a steep attenuation slope below the cutoff frequency, it should react more slowly than a filter having a lesser slope. Since the lower notes mask the bow noise to a greater degree than the high notes, it has been found preferable that the settling time of the filter be asymetrical, having a cutoff frequency which can be lowered at a faster rate than it can be raised. In this manner, when wide intervals are being played at a rapid rate, in such instances as performing trills, the filter simply settles slightly below the lowest note and ignores the higher one. The filter gradually takes the higher note into account as the rate of the trill is lowered so that the cutoff frequency of the filter remains below the fundamental frequency of the played note. This feature of the present invention reduces the distortion in the filtered signal. The filter preferably has no control signal feedthrough a d.c. offsets in the audio signal path which could result in the creation of undesirable transients in the filtered signal when the filter frequency changes at a rapid rate.

It is possible to apply the filtered transducer signal to the fundamental frequency detector in order to achieve a higher degree of performance. By doing so, the reaction time of the fundamental frequency detector is shortened and made more stable over time, especially in the high playing positions of each string where the level of the bow noise is high comparatively to that of the desirable vibrations of the played note. Since the frequency components of the bow noise are approximately constant in a given string, virtually irrespectively of the fingered note, it is possible to limit the cutoff frequency of the filter to a maximum value where the attenuation of the noise is sufficient for the taste of the musician. This reduces the speed requirements of the filter in the higher played positions, thus reducing signal distortion in those instances and possibly making the filter more economical to manufacture.

In a first embodiment, the tone signal from a string transducer is applied to a fundamental frequency detector which produces a control voltage proportional to the frequency of the played note. The transducer signal is also applied to a voltage-controlled high-pass filter, the cutoff frequency of which is governed by the control voltage from the fundamental frequency detector. A minimum frequency voltage is applied to the filter to limit the minimum cutoff frequency of the filter to a frequency slightly below the frequency of the lowest played note. The bow noise level is selectively reduced in the filtered transducer signal.

In a second embodiment, a signal detector controls a bypass circuit which applies a user adjustable control voltage to the filter in the absence of a played note, so that the filter's response to string plucking transients may be set to the muisician's taste. The filtered transducer signal is applied to the audio input of the fundamental frequency detector to increase the speed and accuracy of the detector. The filtered transducer signal is also applied to an audio signal gate, the conductivity of which is determined by the output state of a frequency divider clocked by the period output of the fundamental frequency detector controlling the filter frequency. A sub-octave tone signal of realistic instrumental character is thus produced in addition to the noise-free transducer tone signal.

In a third embodiment, the respective cutoff frequencies of a plurality of filters according to the present invention are individually determined by synthesizer control commands produced by a synthesizer controller interface responsive to the electrical signals from a plurality of string transducers located in the bridge of a bowed instrument.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawing wherein.

DETAILED DESCRIPTION OF THE PREFERRED EMBODIMENTS

Figure 1:
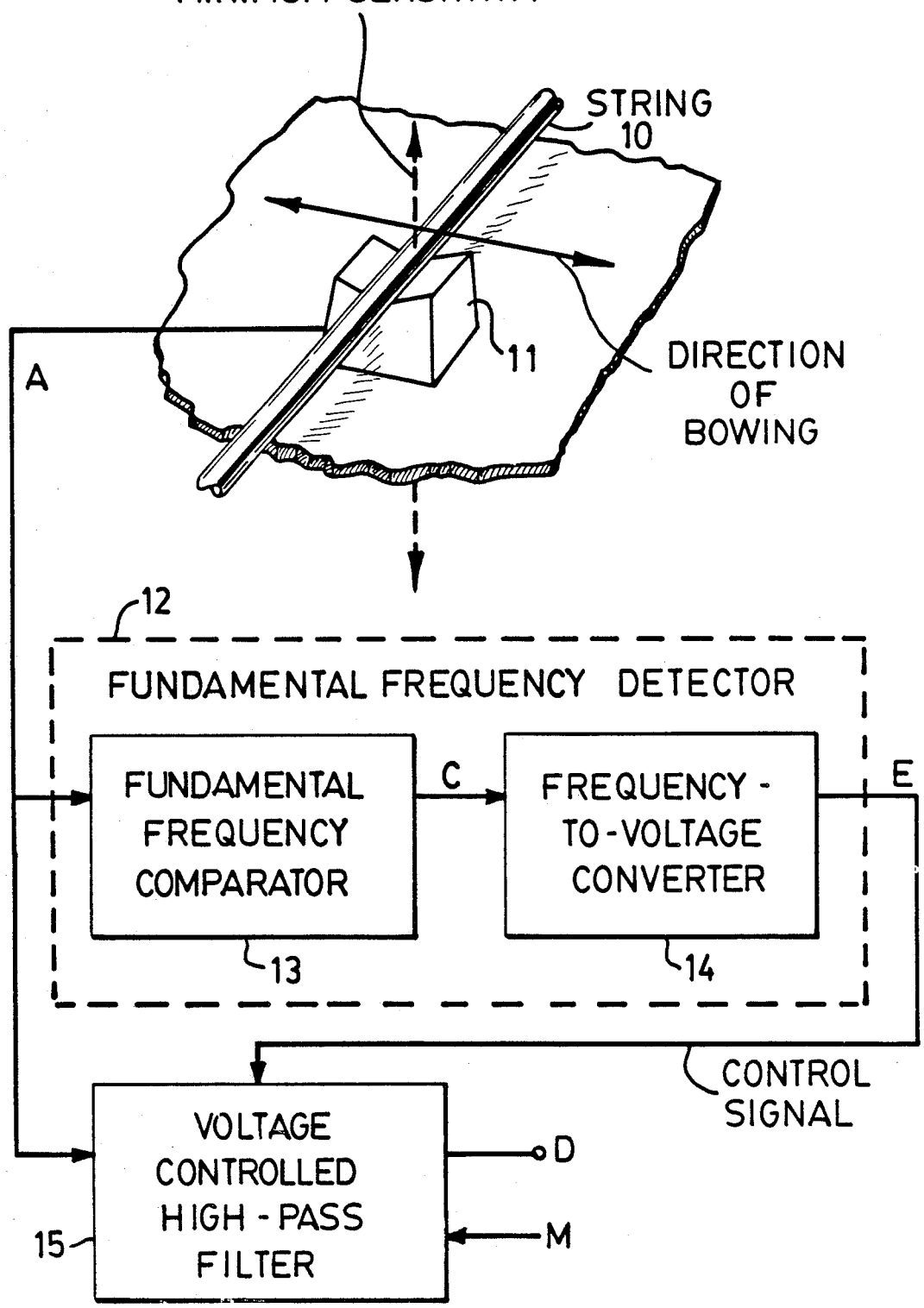
FIG.1 is a block diagram of a first embodiment of the present invention producing a filtered transducer signal.

Referring now to FIG.1 of the drawings, a transducer 11 is monitoring the displacements of a bowed vibrating element such as a string under tension. The transducer 11 may either contact a portion of the instrument or preferably directly contact the vibrating element. The transducer 11 is preferably maximally sensitive in a plane approximately parallel to the plane of bowing and minimally sensitive in a plane perpendicular to the plane of bowing. The plane of bowing refers to a plane determined by and parallel to the direction in which the bow is dragged across the vibrating element to produce a musical tone.

The transducer 11 produces a signal A in response to the monitored displacements of the vibrating element. When the bow is dragged across the vibrating element to produce a musical tone, friction noise is generated in the vibrating element along with the desirable music vibrations. In addition to containing components corresponding to the monitored music vibrations of the vibrating element, the transducer signal A will contain components corresponding to the bow noise, the amplitude of which is a function of the loudness of the music vibrations of the played note. These noise components in the transducer signal A may become objectionable when the played note fails to mask them. In a stringed instrument, the frequency characteristics of the bow noise generated in a given string are quite independent of the vibrating length of the string.

The transducer signal A is passed through a high-pass filter 15 having a controllable cutoff frequency in order to selectively reduce and possibly eliminate the objectionable bow noise components of the signal A without significantly altering the tonal balance of the desirable music vibrations. For this purpose, the cutoff frequency of the filter 15 is maintained at a frequency slightly below the fundamental frequency of the played note. The filter cutoff frequency is controlled by a fundamental frequency detector 12 which produces a control signal E, the magnitude of which varies as a function of the fundamental frequency of the played note.

If the transducer 11 contacts a single vibrating element, it is preferably that the fundamental frequency detector 12 respond to the loudest player note in the transducer signal A. If a plurality of played notes are present in the transducer signal A, the fundamental frequency detector 12 should also preferably respond to the loudest played note. If a plurality of loud played notes are present in the transducer signal A, the fundamental frequency detector 12 should respond to the lowest played note. The fundamental frequency detector 12 should at lest respond to a played note which masks the bow noise to a significant degree.

It is desirable to effect the desired noise reduction without introducing or creating spurious frequencies in the filtered transducer signal D. For this purpose, voltage M imposes a lower limit for the cutoff frequency of the filter 15. This lower limit is preferably set at a frequency slightly below the lowest player note. In a stringed instrument such as a violin, the preferred lower limit is slightly below the fundamental frequency of the open string. This lower limit serves to prevent excessive drops in the cutoff frequency upon a change in the direction of bowing or in the absence of a played note.

An interesting advantage exists in having an adjustable lower limit for the cutoff frequency of the filter 15, in that the response of the filter to the attack transients caused by plucking the string can be made independently adjustable while the bowed notes are filtered in a normal manner. This allows the musician to possibly optimize the frequency response of a reproduction or recording system for best effect with bowed notes and independently set the low frequency response of the plucking attacks for best overall effect. Voltage M can therefore be an adjustable voltage.

Although it is not preferably from the standpoint of performance, it may be preferably from the standpoint of economy of manufacture to vary the cutoff frequency of the filter 15 in stepped increments but their size should be kept sufficiently small to avoid introducing or creating spurious frequencies in the filtered transducer signal D.

The cutoff frequency of the filter 15 is preferably lowered at a faster rate than it is raised in order for it to remain below the lowest played note when large intervals are played at a fast rate in such instances as playing trills. The cutoff frequency should settle slightly below the lowest note of the trill in order to remain below the lowest played note, preferably at all times. In this manner, the tonal balance of the signal is not audibly affected by the filter while the objectionable portion of the bow noise is significantly reduced.

Figure 2:
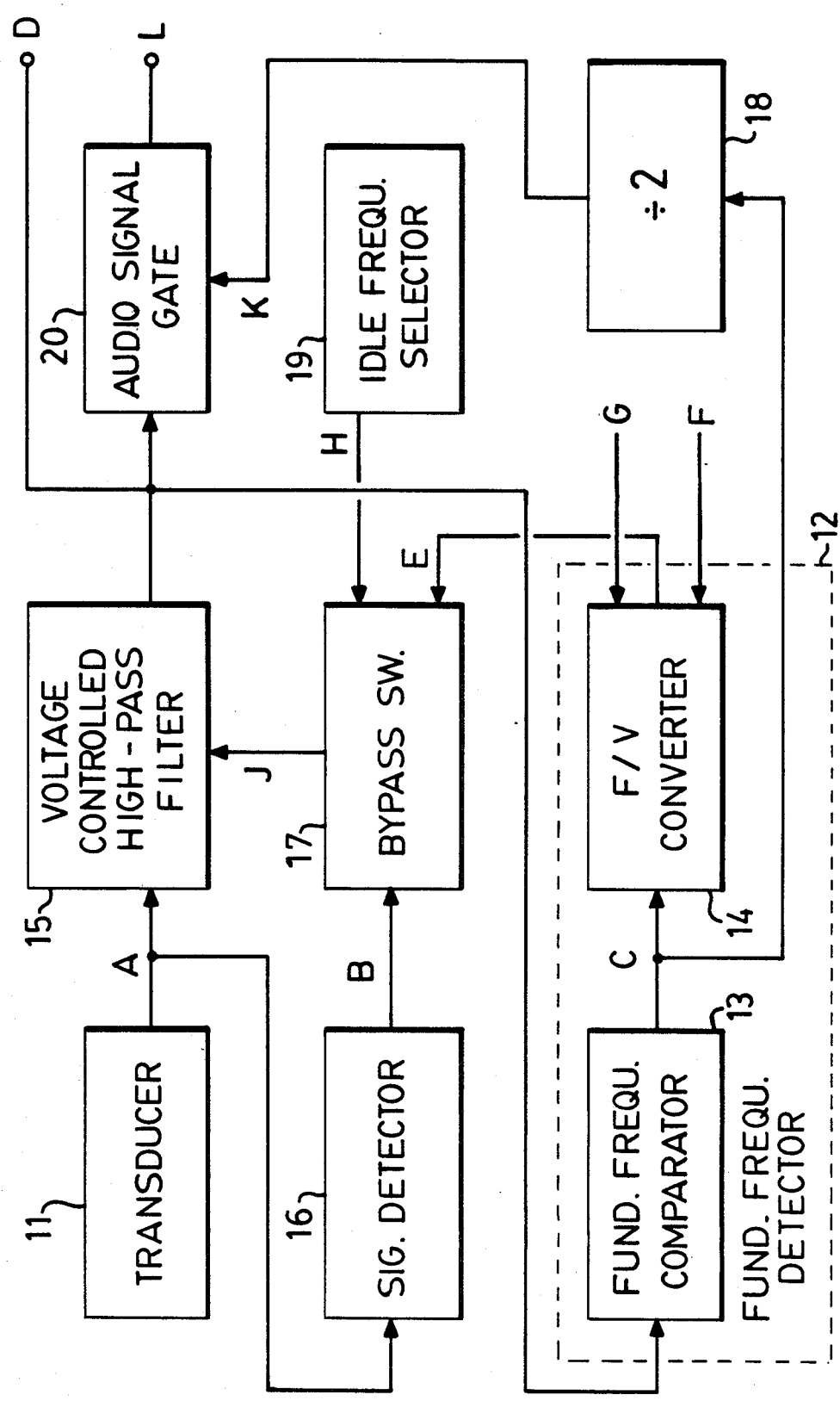
FIG.2 is a block diagram of a second embodiment of the present invention producing a sub-octave voice in addition to producing a filtered transducer signal.

FIG.2 shows a second embodiment of the present invention in which the transducer signal A is passed through the noise-removing high-pass filter 15 before it is applied to the fundamental frequency detector 12 which comprises a fundamental frequency comparator 13 and a frequency to voltage converter 14. By applying the filtered transducer signal D to the fundamental frequency detector 12, the accuracy of the detection is increased since the filter 15 significantly reduces the amplitude of low-frequency transients resulting from plucking attacks and changes in the direction of bowing, which tend to cause erratic operation of the detector 12 and thus prevent signal E from being truly indicative of the fundamental frequency of the played note. The fundamental frequency comparator 13 produces a period output signal C which is a square wave at the fundamental frequency of the played note. The filtered transducer signal D is passed through an audio signal gate 20, the conductivity of which is controlled by signal K from the frequency divider 18. Signal K is a square wave one octave below the frequency of signal C. The audio signal gate 20 thus produces a sub-octave tone signal L the fundamental frequency of which is an octave below that of the played note in the transducer signal A. Since it is a portion of the filtered transducer signal D, signal L is also a bow noise-free signal.

Signal detector 16 produces a signal B indicative of the presence of a played note in the transducer signal A. Signal B is applied to a bypass switch 17. When a player note is detected by the signal detector 16, the bypass switch 17 allows control signal E from the fundamental frequency detector 12 to control the cutoff frequency of the filter 15. In the absence of a played note in the transducer signal A, as detected by the signal detector 16, the bypass switch 17 allows signal H from the idle frequency selector 19 to control the cutoff frequency of the filter 15. The magnitude of signal H is adjustable by the musician.

Figure 3:
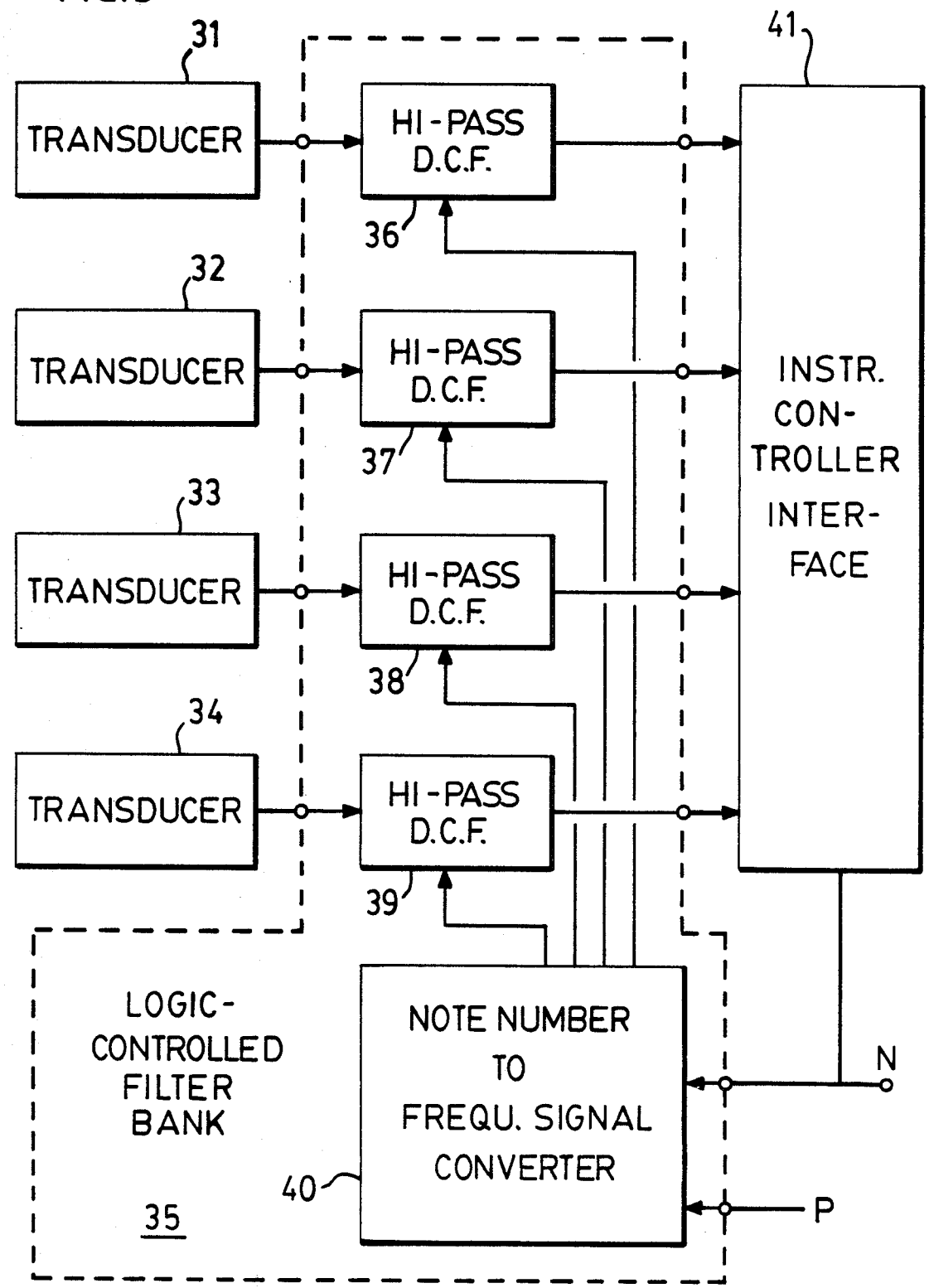
FIG.3 is a block diagram of a third embodiment of the present invention used in conjunction with a synthesizer controller interface.

FIG.3 illustrates a third embodiment of the present invention in which the discrete tone signals from a plurality of string contacting transducers 31, 32, 33 and 34 located in the bridge of a bowed instrument are respectively applied to a corresponding number of digitally-controlled high-pass filters 36, 37, 38 and 39 which are part of a logic-controlled filter bank 35. The separate filtered transducer signals are applied to an instrument controller interface 41 which produces note commands to control a second instrument such as a music synthesizer in response to the played notes in the signals from the transducers 31-34 of the bowed instrument. The note command signal N from the instrument controller 41 is applied to a converter 40 which produces separate filter control signals in response to the note numbers and "bend" commands of signal N. Since the instrument controller 41 may have transposition capabilities, a correction signal P is applied to the converter 40 to compensate for such transposition related offsets and keep the respective cutoff frequencies of the filters 36-39 preferably slightly below the corresponding fundamental frequencies of the played notes in the separate signals from the transducers 31-34.

Since the filtered signals are applied to the instrument controller 41, the frequency detection occurring therein will be more accurate and stable than if the transducer signals were applied directly to the instrument controller 41. The logic-controlled filter bank 35 or a part thereof may be a part of the instrument controller 41 in which the filtered transducer signals may be used for improving the fundamental frequency detection performance of the instrument controller 41. The logic-controlled filter bank 35 or a part thereof may exist in the form of logic instructions used to increase the frequency detection performance of the instrument controller 41. The filter control signals may also be applied to other digitally-controlled functions to create novel effects.

Still other variations of the present invention will suggest themselves to persons of ordinary skill in the art. It is intended therefore that the foregoing description be considered as exemplary only and that the scope of the invention be ascertained by the following claims.

What is claimed is:

1. A device to remove noise from a tone signal of a musical instrument, said tone signal having a plurality of vibratory components corresponding to music vibrations occurring in said instrument and also having a noise component associated with a said vibratory component, said device comprising:

frequency detecting means producing a signal indicative of the fundamental frequency of a played note in said tone signal, high-pass filter means having a variable frequency-response determined by a cutoff frequency which changes in response to a control signal, and producing a filtered tone signal in response to said tone signal, and means to control said cutoff frequency of said high-pass filter means with said signal indicative of said fundamental frequency of said played note, whereby said noise component of said tone signal is selectively reduced in said filtered tone signal and whereby said vibratory components of said tone signal are not substantially altered with respect to one another in said filtered tone signal by action of said high-pas filter means, irrespectively of a change in said fundamental frequency of said played note.

2. The device of claim 1 wherein said tone signal is produced by a transducer monitoring a bowed vibrating element and wherein said transducer has a minimum sensitivity to vibrations of said vibrating element occurring in a plan (other than and preferably) approximately perpendicular to (the plane of said bowing) a plane determined by a direction of bowing of said vibrating element.

3. The device of claim 1 wherein a said played note is masking said noise in a said tone signal.

4. The device of claim 1 wherein a said played note is the lowest note in a said tone signal.

5. The device of claim 1 wherein a said played note is the loudest note in a said tone signal.

6. The device of claim 1 wherein said filtered tone signal is applied to said frequency detecting means, whereby said frequency detecting means produces a more accurate said signal indicative of said fundamental frequency, thereby controlling said cutoff frequency of said high-pass filter means with increased accuracy and thereby selectively reducing said noise component of said tone signal with increased accuracy in said filtered tone signal.

7. The device of claim 1 further comprising means to prevent said cutoff frequency of said high-pass filter means from falling below a lower limit corresponding to a minimum cutoff frequency of said high-pass filter means.

8. The device of claim 1 further comprising means to control a said cutoff frequency during a change in the direction of said bowing.

9. The device of claim 7 further comprising means to selectively adjust said lower limit corresponding to said minimum cutoff frequency of said high-pass filter means.

10. The device of claim 1 wherein said cutoff frequency may be lowered at a faster rate than it may be raised.

11. The device of claim 1 wherein said frequency detecting means is a part of an instrument controller.

12. The device of claim 1 wherein a said high-pass filter means is responsive to note commands produced by an instrument controller.

* * * * *